3,511,291
RENEWED HEAVY-DUTY TIRE WITH
A LUGGED TREAD THEREON
Bradley E. Ragan, Spruce Pine, N.C., assignor to Brad Ragan, Inc., Spruce Pine, N.C., a corporation of North Carolina
Original application Dec. 20, 1966, Ser. No. 603,340, which is a continuation-in-part of application Ser. No. 569,863, Aug. 3, 1966, now abandoned. Divided and this application Feb. 25, 1969, Ser. No. 802,186
Int. Cl. B60c 11/08
U.S. Cl. 152—209                       6 Claims

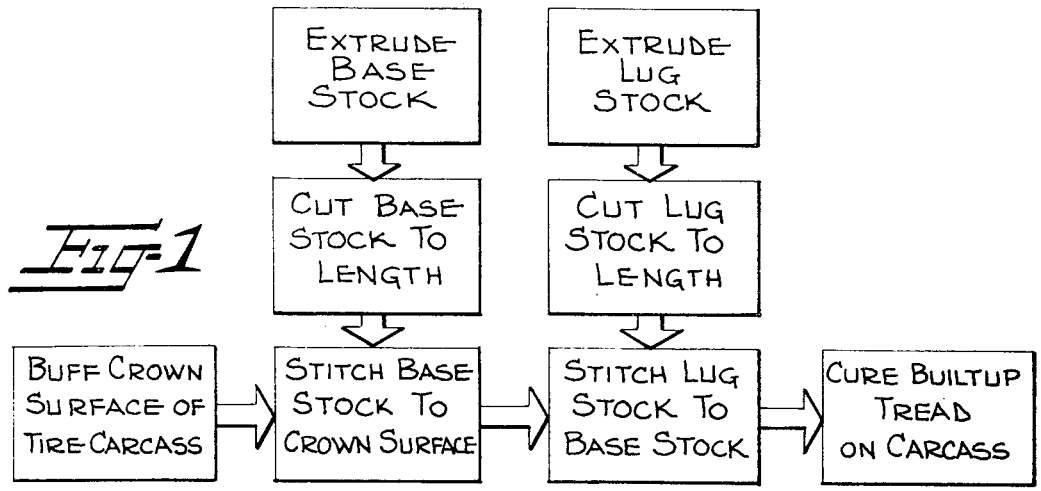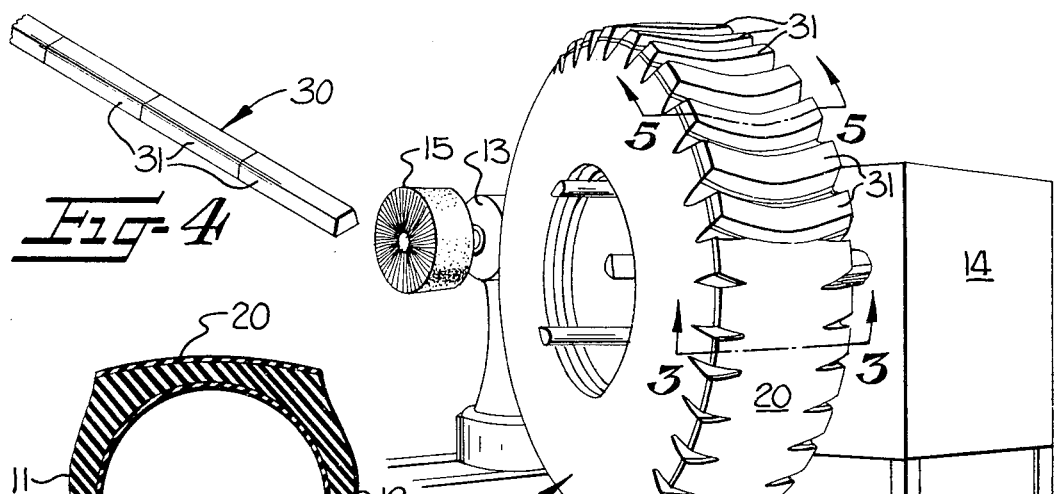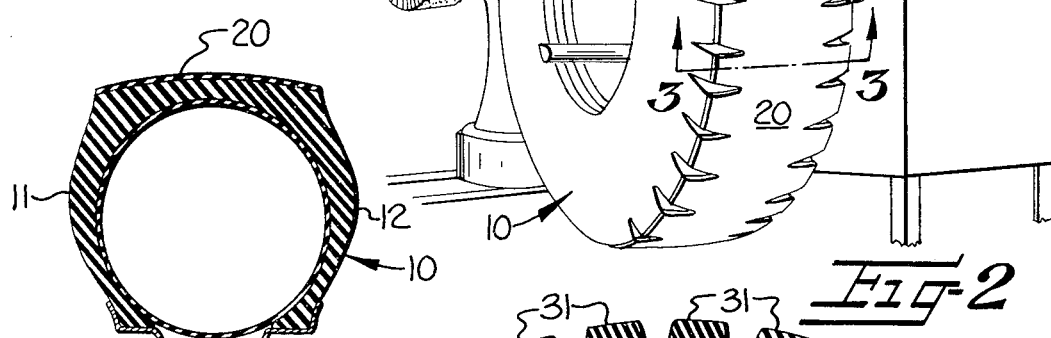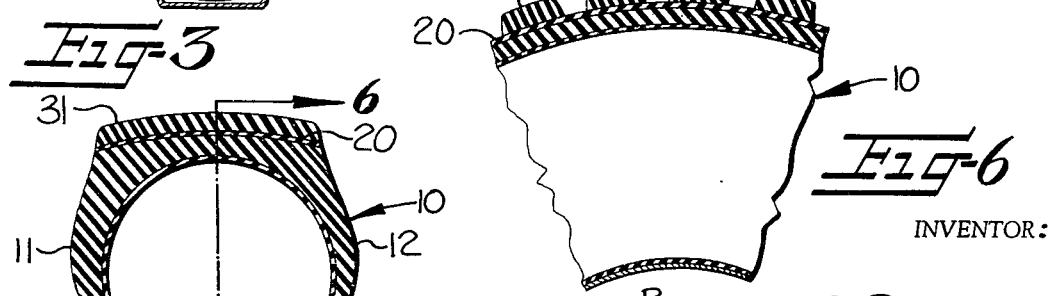
INVENTOR:
BRADLEY E. RAGAN
BY Parrott, Bell, Seltzer, Park & Gibson
ATTORNEYS United States Patent Office 3,511,291
Patented May 12, 1970

ABSTRACT OF THE DISCLOSURE

A renewed heavy-duty tire of the off-the-road type having a lugged tread thereon composed of a first body of tread renewal material entirely encircling and intimately adhered to a previously used tire carcass and a plurality of additional and discrete bodies spaced about and intimately adhered to the first body of tread renewal material.

---

This application is a divisional of application Ser. No. 603,340, filed Dec. 20, 1966, issued Sept. 2, 1969 as U.S. Pat. No. 3,464,874 entitled "Method of Building a Lugged Tread on a Heavy-Duty Tire," which was a continuation-in-part of application Ser. No. 569,863, filed Aug. 3, 1966, entitled "Method of Building a Lugged Tire Tread," now abandoned.

The tread designs characteristic of large pneumatic tires used with heavy off-the-road equipment, such as size 11.00 x 20 and larger earthmover tires, are intended primarily to provide traction and/or protection against sideslip for the equipment, through the use of a tread including lugs extending in desired predetermined directions relative to the crown of the tire. Heretofore, such lugged treads for heavy-duty tires have been renewed in accordance with conventional methods. In following such methods, the carcass of a heavy-duty tire is first buffed down, then built up with sidewalls and a relatively thick crown of uncured rubber, and then positioned in an encircling mold which bears a lugged tread design, to mold the tread design into the crown portion of the tire while simultaneously vulcanizing the uncured rubber. In such recapping, the thick crown of uncured rubber on the carcass is provided by a preform known in the trade as "camelback," which is manufactured to size for each tire size being renewed.

Significant problems are presented by this method of building treads for large, heavy-duty tires. With such tire sizes, the molds and other equipment used in conjunction with this method are quite expensive, and a large capital investment is required if many of the wide range of heavy duty tire sizes are to be accommodated. While it is conventional practice to accommodate more than one size or manufacture of off-the-road tire in a single toroidal mold by slightly deforming the carcass during the curing period, thereby increasing the number of types of tires which may be accommodated in a limited number of molds, it has heretofore been recognized that curing a tire while in a deformed condition gives rise to a permanent set thereof in the distorted condition. Additionally, a further difficulty is that camelback must be stocked in preforms of the correct size for use with each of the molds employed and has a limited shelf life, thus requiring investment in a large inventory of perishable goods.

In an effort to avoid the difficulties and expense involved in providing the necessary supplies and equipment and in following the conventional method for renewing heavy-duty lugged tread tires, it has heretofore been proposed to renew such a tire by relugging. Relugging is a method which involves removing a portion of a worn lug to leave a stub having a smooth surface and then securing a length of uncured rubber lug stock to the stub surface. Such a method obviates the use of a tread mold curing vessel and reduces the quantity of uncured rubber stock which must be used in renewing the tread, but does not entirely avoid the inventory problem and introduces serious difficulties in obtaining a bond between the cured rubber lug stub and the relugging stock.

Conventionally, uncured rubber such as camelback or relugging stock is secured to the tire carcass being renewed through the use of a thin layer of a soft rubber material known as cushion gum. Cushion gum, while necessary to permit obtaining adhesion of the uncured rubber stock to the cured rubber of the tire carcass at a conveniently low temperature, has substantially less tensile strength than either the tire carcass or the stock, both when in the uncured state for application and after curing of the renewed tire. Thus, the renewal of a tread in accordance with a method relying on the use of cushion gum results in an inherent plane of weakness at the join of the cushion gum to the tire carcass. Such a weak join is particularly troublesome in a relugged heavy-duty tire of the type to which the present invention is directed, inasmuch as high stresses are imposed on the lugs and will result in separation of the added lug stock from the original carcass.

With the foregoing deficiencies in mind, it is an object of this invention to make available renewed heavy-duty tires of the off-the-road type in which the strength of lugs defining a tread for the renewed tire is not impaired by the presence of a weak join but has the bonded strength characteristic of adhesion together of bodies of tread renewal material cured at the same time. In accomplishing this object, a renewed tire has three constituents, namely the previously used tire carcass which has been renewed, a first body of tread material encircling and intimately adhered to the tire carcass, and a plurality of additional and discrete bodies intimately adhered to the first body of tread renewal material. The first body of tread renewal material provides a smooth exterior bonding surface and a large bonded area between the previously cured tire carcass and the renewal cured material. The plurality of additional bodies of tread renewal material project outwardly from the bonding surface of the first body and define a lugged configuration for the renewed tire. The strength of bond between the renewal cured materials resists separation of the bonded materials even though stressed during use of the tire.

A further object of this invention is to provide a renewed heavy-duty tire wherein an extended useful life for the renewed tire is facilitated by the structural characteristics of the renewed tire.

Some of the objects and advantages of the invention having been stated, others will appear as the description proceeds, when taken in connection with the accompanying drawings in which—

FIG. 1 is a diagrammatic representation of the steps of the method of this invention;

FIG. 2 is a perspective view of a tire carcass on which a lugged tread is being built in accordance with this invention;

FIG. 3 is a section view through the tire of FIG. 2, taken substantially along the line 3—3 in that figure;

FIG. 4 is a perspective view of a length of lug stock in accordance with the present invention;

FIG. 5 is a view similar to FIG. 3, taken along the line 5—5 of FIG. 2; and

FIG. 6 is a section view through the tire of FIG. 2, taken substantially along the line 6—6 in FIG. 5.

Referring now more particularly to the drawing, the building of a lugged tread on a heavy-duty tire in accordance with the method of this invention proceeds step by step generally from left to right and from top to bottom of the diagrammatic representation of FIG. 1. While FIG. 1 is intended to briefly represent the successive steps undertaken in practicing the method of this invention, it is believed that a better understanding of the method may be obtained by a description given with reference to a tire, such as the tire indicated generally at 10 (FIG. 2), at one stage in the building thereon of a lugged tread in accordance with the method of this invention.

Conventionally, the tire 10 includes sidewall portions 11, 12 which define the shoulders of the tire and the external crown or tread face of the carcass therebetween (FIGS. 3, 5, 6). The initial step of my method is to form the crown of the tire 10 to have a smooth surface, which preferably is accomplished by buffing to substantially remove worn tread lugs therefrom. Buffing may be done by mounting the tire 10 on a suitable support 14 (FIG. 2) for rotation adjacent a buffing wheel 15 driven by a motor 13. Such apparatus is conventional and not critical to practice of my method. It is, however, important that the crown surface be properly prepared for further steps in my method by being clean and free from dirt or grease.

In order to avoid insofar as possible disturbing the characteristics of tire construction initially chosen by the designer of the tire, and thereby contribute to increasing the useful life of the renewed tire, it is preferred that the shoulders and sidewalls of the tire, such as the tire 10, remain unbuffed. This is to be contrasted with the usual practice where a full cap is used which includes both a crown portion and sidewalls.

In order to assure the greatest possible area of contact between the cured rubber of the carcass of the tire 10 and the uncured rubber material applied to build up a tread in accordance with this invention, the prepared surface is subsequently encircled with a portion of a strip of base stock. The base stock is formed by extruding uncured rubber as a flat strip having a width substantially the same as the width of the prepared crown surface of the tire 10 and a thickness substantially less than its width. As herein used, the word "rubber" is intended to refer to all elastomeric materials suitable for use in the manufacture or renewal of large heavy-duty earthmover tires, whether natural, synthetic, or mixtures thereof. Preferably, a portion having a length substantially the same as the circumference of the crown surface of the tire 10 is promptly thereafter severed from the base stock and positioned to encircle the prepared crown surface of the tire 10 to extend entirely over that crown surface. By suitable application of pressure, the base stock portion 20 is stitched, or temporarily adhered, to the cured rubber carcass of the tire 10 (FIG. 3).

In extruding uncured rubber to form the base stock used in my method, I prefer to employ an extruder such as that described in U.S. Pat. No. 2,958,098, which permits an operator renewing lugged tires to substitute removable dies and readily extrude stock of the requisite width for the various sizes being processed. Additionally, such extrusion at the point of use permits prompt severance of the portion to be used from the extruded body of base stock and stitching to the crown surface while the severed portion is substantially at its extrusion temperature. The extrusion temperature is in excess of 150° F., usually being approximately 170° F., and stitching substantially at this temperature promotes a more uniform and ahesive bond between the cured and uncured rubber than would be obtained at lower bonding surface temperatures. Due to the higher temperature, the more suitable characteristics of the freshly extruded rubber and the large surface area for bonding, the resulting join is substantially stronger than could be obtained through the use of cushion gum and approaches the strength of a unitary block of one of the joined rubber materials.

While it is preferred to stitch the base stock portion 20 to the cured rubber carcass of the tire 10 while the base stock is near the extrusion temperature, it has been found that the large area of surface contact obtained between the base stock and the carcass permits obtaining a bond therebetween of substantially the same strength even when the base stock has been permitted to cool, provided that certain procedures are followed. In order to obtain a strong bond between relatively cool base stock and a cured rubber carcass, and to avoid introducing a plane of weakness in the renewed tire, the surfaces to be adhered are wiped with rubber solvent and afterward coated with a thin layer of a heavy-duty rubber cement such as Goodyear's Nylo-Bond. After the carrier for the cement has evaporated, the base stock band is positioned encircling the carcass and stitched into place.

In order to provide built-up lugs for the tread of the tire 10, uncured rubber is similarly extruded to form lug stock 30 (FIG. 4), which is of trapezoidal cross-sectional configuration and has a thickness of approximately one-half of its major width dimension. Preferably (as shown in FIG. 6) the cross-sectional configuration of the lug stock 30 is that of an isosceles trapezoid, in order to assure that the spaces between lugs in the tread design are substantially self-cleaning.

After extrusion of the lug stock 30, the stock is cut into a plurality of portions 31, each having a length correlated to a dimension of the crown surface of the tire 10 in accordance with the particular lug design to be used in renewing the tire. Each of the portions of the lug stock 30 is then positioned on the tire 10 in a predetermined direction relative to the crown surface and spaced from adjacent lug stock portions at a predetermined distance in order to provide the desired tread design.

If the lug stock portions 31 are at or near the extrusion temperature when stitched to the base stock portion 20 on the crown surface of the tire 10, the portions may be readily deformed to assume any desired direction across the crown surface of the tire, thus making possible the adaptation of the method of my invention to any tread design chosen for use with a large heavy-duty tire. In this connection, it should be pointed out that the particular tread design illustrated in FIG. 2 is merely illustrative of one type of tread design with which the method of my invention may be used. In addition to deformability of the lug stock portions 31, prompt severance and stitching of these portions assures bonding of the lug stock to the base stock under the most favorable conditions, as the bond is between two surfaces of freshly extruded uncured rubber. Such a joint, subsequent to curing, has substantially the same strength as the remainder of the lug stock portion, and thus readily withstands the stresses imposed during the use of the re-lugged tire.

The possibility of deforming the lug stock portions 31 while the same are at or near the extrusion temperature, while permitting accommodation thereof to some particular tread designs, may introduce a difficulty if a power driven stitching device is used. In that event, the stitching device may cause undesirable deformation of the lug stock and result in distortion of the desired tread design. Accordingly, where a tread design not requiring deformation of the lug stock is used and the saving in labor realized from a power driven stitching device is desired, it is preferred to apply the lug stock portions 31 after the same have cooled, following the procedure outlined above for application of the band of base stock. As to this application of lug stock, the adhesive bond is between two bodies of uncured rubber material, and thus is substantially stronger, per unit of surface area, than a bond between cured and uncured rubber.

Subsequent to stitching of the lug stock portions 31 to the base stock 20, the built-up lug tread on the tire 10 is cured by being subjected to suitable temperatures and pressures for a required time, as generally known in the working of rubber materials. Such curing, in accordance with the method of my invention, preferably does not involve the use of a mold vessel and is performed in an open vessel such as that illustrated and described in U.S. Pat. No. 2,271,855. The time and temperature required are determined by the thickness of the base stock and lug stock portions used. I have found, however, that subjecting a heavy-duty tire of the type with which this invention is concerned to a temperature of 260° F. for a period of six to ten hours is satisfactory.

It is believed that curing the built-up lug tread on the tire 10 in accordance with the method of this invention, in an open steam vessel, provides particular advantages and results in increased tread life for the renewed tire. When cured in an open steam vessel, a temperature of approximately 260° F. is applied to the renewal tread both outwardly from within the carcass and inwardly from the tread surface. This is to be contrasted with conventional mold curing practice wherein a temperature of approximately 295° F. is applied only inwardly from the tread face. In following this conventional practice, the attainment of curing temperatures at the mating surfaces of cured and uncured rubber requires that the tire be maintained at a higher temperature for a substantially longer period of time, and frequently results in overcuring of the wear surface of the tread. A tire cured in accordance with the method of this invention, in an open steam vessel, is satisfactorily cured while being maintained at a lower temperature for a shorter period of time, so that the tread surface retains a greater resilience, to which an increase in useful life is attributed. Additionally, the use of an open steam vessel permits the tire with built-up lugged tread to be cured without distortion, in that the tire may be in a substantially relaxed condition as compared with the deformation heretofore sometimes necessary to force a tire into a mold for curing.

It is apparent that the method herein described makes possible the renewal of large, heavy-duty lugged tread tires, of the type used in earth moving equipment, with a substantial saving in capital investment required while obtaining additional benefits of strengthened wear surfaces and avoidance of distortions in the tire construction. These benefits and advantages are obtained through the use of base and lug stock materials extruded for use with a variety of sizes and tread configurations of tires, applied so as to attain secure bonding, and cured in a manner to avoid the introduction of distortion and maintain a higher degree of resilience than has heretofore conventionally been obtained.

In the drawings and specification, there have been set forth preferred embodiments of the invention, and although specific terms are employed, they are used in a generic and descriptive sense only and not for purposes of limitation.

I claim:

1. A renewed heavy-duty tire of the off-the-road type characterized by having sidewall curvature and flex characteristics substantially the same as before renewal thereof and by being completely devoid of cushion gum and comprising
    a previously used tire carcass which orignally had a lugged configuration tread thereon and which has sidewalls defining a crown portion therebetween, said tire carcass sidewalls being of predetermined thickness, configuration and flexibility at least substantially corresponding to such characteristics thereof prior to renewal, as by being substantially unaltered through removal of material therefrom, accretion of material thereto or intentional distortion during renewal curing,
    a first body of tread renewal material defining a bonding band entirely encircling and intimately adhered to said tire carcass crown portion for providing a large bonding area between previously cured and renewal cured material and being of generally uniform radial thickness throughout the extent thereof for providing a smooth exterior bonding surface substantially free of surface irregularities, and
    a plurality of additional, independent and discrete bodies of tread renewal material spaced one from another about said tire carcass crown portion and intimately adhered to said first body of tread renewal material, said additional bodies of tread renewal material projecting outwardly from said first body bonding surface and defining a lugged configuration tread for the renewed tire.

2. A renewed tire according to claim 1 wherein said additional bodies of tread renewal material correspond in number and spacing to the original tread configuration.

3. A renewed tire according to claim 1 wherein said band body is a single convolution of tread renewal material formed to have predetermined width and thickness dimensions correlated to the dimensions of said carcass.

4. A renewed tire according to claim 3 wherein each of said tread defining bodies is a unitary block of tread renewal material formed to have predetermined dimensions correlated to the dimensions of said carcass.

5. A renewed tire according to claim 1 wherein the tire is characterized by having sidewall curvature and flex characteristics substantially the same as before renewal thereof and wherein said sidewalls are of predetermined thickness, configuration and flexibility at least substantially corresponding to such characteristics thereof prior to renewal, as by being substantially unaltered through removal of material therefrom, accretion of material thereto or intentional distortion during renewal curing, and said band body is of substantially uniform radial thickness throughout the width and circumferential extent thereof.

6. A renewed heavy-duty tire characterized by having sidewall curvature and flex characteristics substantially the same as before renewal thereof and comprising:
    a previously used tire carcass having sidewalls of predetermined thickness, configuration and flexibility at least substantially corresponding to such characteristics thereof prior to renewal, as by being substantially unaltered through removal of material therefrom, accretion of material thereto or intentional distortion during renewal curing,
    a bonding band of tread renewal material entirely encircling and intimately adhered to said tire carcass in the area defined between said sidewalls so as to provide a large bonding area between previously cured and renewal cured material, and
    a plurality of outwardly projecting bodies of tread renewal material spaced about and intimately adhered to said band body so as to define thereon a lugged configuration tread.

References Cited

UNITED STATES PATENTS

| 2,065,696 | 12/1936 | Hawkinson | 152—209 |
| 2,090,256 | 8/1937 | Heintz | 152—209 |
| 2,474,013 | 6/1949 | Rawls | 152—209 |
| 2,611,411 | 9/1952 | Rawls | 152—209 |
| 2,689,200 | 9/1954 | Johnson | 152—209 |
| 3,136,673 | 6/1964 | Carver | 152—209 |

ARTHUR L. LA POINT, Primary Examiner

C. B. LYON, Assistant Examiner

Disclaimer 3,511,291.—*Bradley E. Ragan*, Spruce Pine, N.C. RENEWED HEAVY-DUTY TIRE WITH A LUGGED TREAD THEREON. Patent dated May 12, 1970. Disclaimer filed Oct. 26, 1970, by the assignee, *Brad Ragan, Inc.*

Hereby disclaims the terminal portion of the term of said patent subsequent to September 2, 1986.

[*Official Gazette December 1, 1970.*]